June 5, 1962
S. KUSZNIER
3,037,710
WATERITE
Filed Nov. 21, 1960
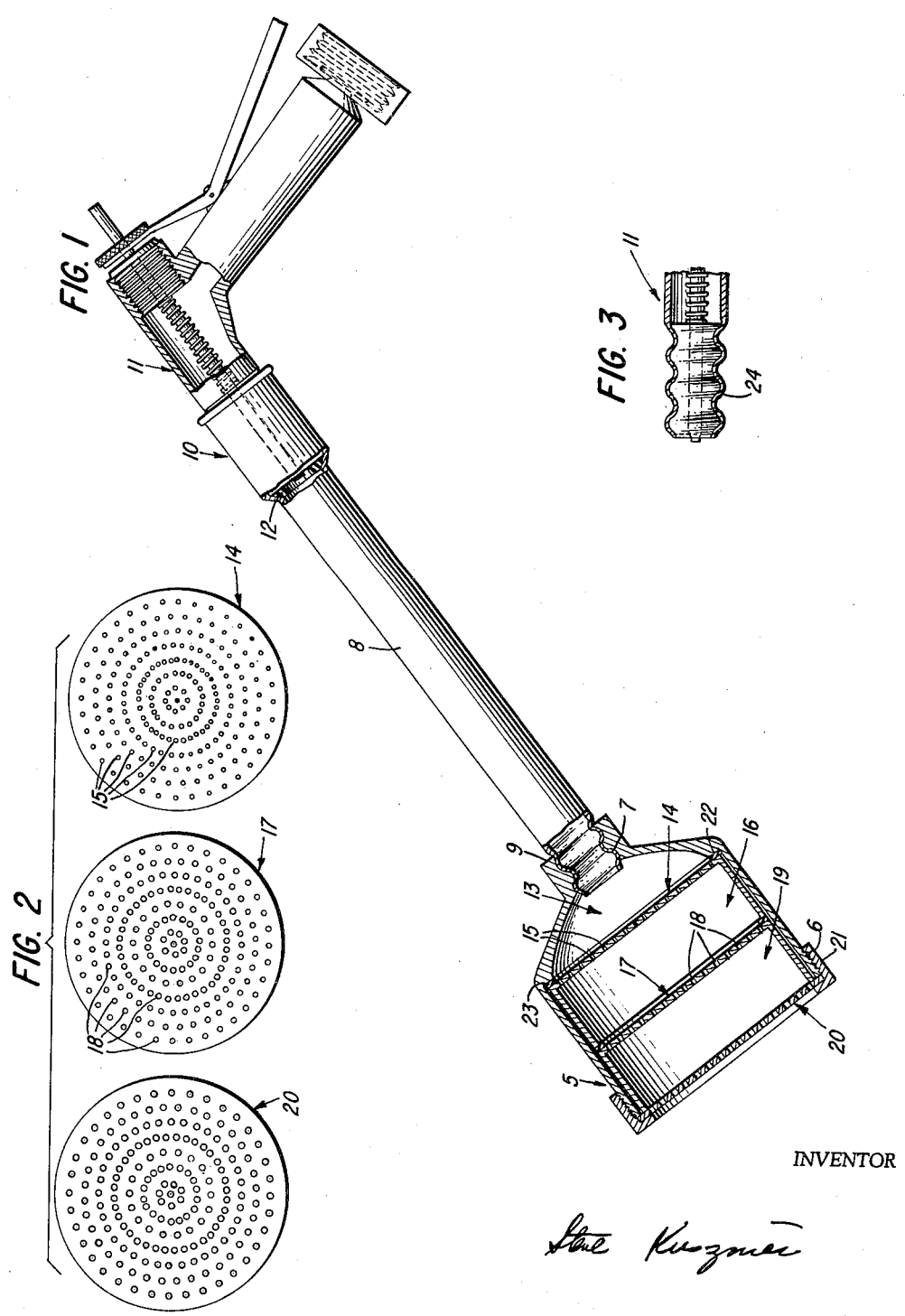
INVENTOR
Steve Kusznier

United States Patent Office 3,037,710
Patented June 5, 1962

3,037,710
WATERITE
Steve Kusznier, Westbury, N.Y.
Filed Nov. 21, 1960, Ser. No. 70,897
1 Claim. (Cl. 239—526)

The invention as described herein, and illustrated in the accompanying drawings consists of a watering attachment to discharge water with a reduced pressure.

An object of the invention is to provide means whereby pressure reduced water will be discharged into the soil, surrounding growing plants with ease and providing gentle touch to young tender plants and shrubs.

Another object of this invention is to provide a pressure reducing unit that can easily be replaced by spare parts or a whole unit.

A further object of this invention is to provide a watering attachment with two separate detachable disc-cups and one separate detachable flat disc.

Another object of this invention is to provide an elongated tube to facilitate watering.

Another object of this invention is to provide varied size of holes for short or long distance sprays, the orientation of the holes being chosen to cover wide areas in short time.

Another object of this invention is to provide water at the right places eliminating implements to be carried back and forth to be refilled, wherein flow of water is increased or decreased by squeezing the trigger on the nozzle depending upon what pressure is needed for different plants.

Another object of the invention is to provide multiple disc-cups inside a shell, the uppermost disc-cup with the smallest holes followed by a disc-cup with larger holes and a bottom disc having larger holes than the second disc-cup.

Other features and advantages will become more readily apparent from the following description and accompanying drawing in which:

FIG. 1 is a side view of an embodiment of the invention.

FIG. 2 is a detail view of the disc-cups.

FIG. 3 is a detail view of a round threaded end on the water nozzle.

In order to accomplish the objects set forth above and referring to the figures, the attachment 5 has been designed so that shell 9 is provided with a threaded end 6 and an opposite end 7, which is connected to a tube 8. The upper end 10 of tube 8 is screwed onto handle 11 around threaded end 24 on the water nozzle, sealing with a washer 12.

Water flowing through member tube 8 enters chamber 13, and is forced through disc-cup 14, holes 15, to middle chamber 16, and is forced again through second disc-cup 17, through holes 18, which holes are somewhat larger than 15, enters chamber 19, is again forced through a disc 20, which has holes which are slightly larger than the holes in disc-cup 17. Disc 20 is held on by cap nut 21, said nut 21 being tight on shell 5 to hold the disc-cups snugly against ledge 22 and over washer 23, thus forming a water-tight chamber.

From the foregoing, it will be seen that water under pressure entering chamber 13 will force its way to second chamber 16 under reduced pressure, further force its way through to chamber 19, reducing the pressure considerably, and then flow through disc 20, to the outside, thus being reduced to a soft spray.

I claim:

A device for producing a spray of liquid, a body member defining a main chamber, including an elongated tubular member, one end of said tubular member having means for detachably connecting said member to the discharge end of a watergun nozzle adapted to deliver liquid under pressure through said elongated tubular member to said main chamber; the lower part of said tubular member having round threaded means detachably connecting said member to upper threaded means in the main chamber; a plurality of perforated disc-cups and a perforated flat disc positioned in said chamber and spaced in relation to one another forming three separate chambers within said main chamber, said disc-cups and flat disc being perforated somewhat different in size to one another; a projecting shoulder provided on the inner upper surface of said main chamber having an annular gasket interposed therein, the upper disc-cup being inverted and perforated at its top and having a flat circular surface seated over said annular gasket, thus forming a fluid tight seal; said upper disc-cup being inverted, the lower part rim of said inverted disc-cup engaging said flat circular surface of the second disc-cup, the perforation on the second disc-cup being somewhat larger in diameter than those in the upper disc-cup, said second disc-cup being inverted and engaging said flat disc on its outer edges at the discharge end of the main chamber; a cap nut provided to engage the outer edge at the discharge end of the main chamber for positioning and holding the disc-cups and flat disc in their properly spaced relationship, thus forming water tight chambers within said main chamber.

References Cited in the file of this patent
UNITED STATES PATENTS

| | | |
|---|---|---|
| 2,256,729 | Thompson | Sept. 23, 1941 |
| 2,358,386 | Doll | Sept. 19, 1944 |
| 2,621,076 | Barton | Dec. 9, 1952 |
| 2,715,045 | Thompson | Aug. 9, 1955 |
| 2,754,097 | Hjulian | July 10, 1956 |
| 2,887,275 | Dixon et al. | May 19, 1959 |